ced Aug. 20, 1968

3,398,131
HOMOPOLYMERIZATION OF ETHYLENE FOR THE PRODUCTION OF SOLID AND LIQUID POLYMERS
Herman S. Bloch, Skokie, and Ernest L. Pollitzer, Hinsdale, Ill., assignors to Universal Oil Products Company, Des Plaines, Ill., a corporation of Delaware
No Drawing. Filed Apr. 22, 1964, Ser. No. 361,886
13 Claims. (Cl. 260—94.9)

ABSTRACT OF THE DISCLOSURE

Production of solid and liquid polymers by homopolymerization of ethylene in the presence of an alkali metal disposed on a high surface area inorganic oxide support promoted with an alkali or alkaline earth metal compound in sufficient amount to neutralize the acidity of the support.

---

This invention relates to a novel process for the polymerization of ethylene. More specifically, the invention is concerned with a process for polymerizing ethylene in the presence of a novel catalytic composition of matter.

The use of detergents has increased at a very rapid rate over the past several years. The detergents have supplanted soaps as cleansing agents due to the superior cleansing ability of the detergents. The detergents comprise, for the most part, alkyl benzenes which have been sulfonated and converted to the alkali metal salt thereof. However, most of the detergents now in use have an objectionable feature which is becoming more readily apparent due to the overwhelming use of these detergents. This objectionable feature is that said detergents are not biodegradable. That the detergents are not biodegradable is readily apparent because many rivers and streams into which sewage or wash water is dumped will contain suds and foam which are not degraded due to bacterial action thereupon. These large masses of foam and suds have become menaces to public health inasumch as the suds have found their way into sources of drinking water of various communities. One theory concerning the non-biodegradability of the present day detergents is that the objectionable feature is due to the fact that the long alkyl chain is highly branched and is therefore resistant to the action of bacteria thereon. Therefore, it is necessary that compounds which possess surface active and detergent characteristics or properties must, in the future, be susceptible to biodegradation. One method of obtaining compounds which possess the desirable characteristics is to prepare an alkylbenzene in which the alkyl chain is of relatively long length and is either straight chain or only slightly branched in configuration, said alkylbenzenes being capable of conversion to sulfonate detergents which are biodegradable.

It is therefore an object of this invention to provide a process for the polymerization of olefinic hydrocarbons, and particularly ethylene, to prepare useful chemical intermediates.

A further object of this invention is to provide a process for the polymerization of ethylene in the presence of a novel composition of matter whereby the resultant polymer comprises a mixture of a high molecular weight solid and a slightly branched liquid olefin.

In a broad aspect one embodiment of this invention resides in a process for the polymerization of ethylene which comprises treating ethylene at polymerization conditions in the presence of a polymerization catalyst comprising an alkali metal disposed on a high surface area, substantially anhydrous solid support which has been promoted with a compound selected from the group consisting of the salts and hydroxides of the alkali metals and alkaline earth metals and thereafter calcined, and recovering the resultant polymers.

Another embodiment of this invention is found in a process for the polymerization of ethylene which comprises treating ethylene at a temperature within the range of from about 100° to about 200° C. and at a pressure within the range of from about 500 to about 2500 p.s.i.g., in the presence of a polymerization catalyst comprising an alkali metal disposed on a substantially anhydrous gamma-alumina which has been promoted with a compound selected from the group consisting of the salts and hydroxides of the alkali metals and alkaline earth metals and thereafter calcined, and recovering the resultant polymers.

Yet another embodiment of the invention resides in a polymerization catalyst comprising an alkali metal disposed on a high surface area, substantially anhydrous solid support which has been promoted with a compound selected from the group consisting of the salts and hydroxides of the alkali metals and the alkaline earth metals and thereafter calcined.

A specific embodiment of the invention is found in a process for the preparation of solid polymers and liquid olefinic polymers which comprises treating ethylene at a temperature within the range of from about 100° to about 200° C. and at a pressure within the range of from about 500 to about 2500 p.s.i.g., in the presence of a polymerization catalyst comprising sodium disposed on a substantially anhydrous gamma-alumina which has been promoted with lithium nitrate and thereafter calcined, and recovering the resultant polymers.

Another specific embodiment of the invention is found in a polymerization catalyst comprising sodium disposed on a substantially anhydrous gamma-alumina which has been impregnated with lithium nitrate and thereafter calcined.

Other objects and embodiments will be found in the following further detailed description of this invention.

As hereinbefore set forth, it has now been discovered that olefinic hydrocarbons, and particularly ethylene, may be polymerized in the presence of a catalyst comprising an alkali metal disposed on a high surface area, substantially anhydrous solid support which has been promoted with a compound selected from the group consisting of the salts and hydroxides of the alkali metals and alkaline earth metals and thereafter calcined, to form certain polymeric products. The polymeric products which are obtained according to the process of this invention comprise high molecular weight solids and straight-chain or slightly branched liquid olefins. The former comprise waxy solids having a melting point of about 125°–130° C. and may be utilized in the manufacture of polishes, wax coatings, plasticizers, resins, etc., while the latter, which comprise olefins containing from about 8 to about 18 carbon atoms and, as hereinbefore set forth, are straight-chain or slightly branched in configuration, may be used in the manufacture of chemical intermediates such as alkylbenzenes which are capable of being converted to sulfonate detergents which are biodegradable in nature. While the exact mechanism of the reaction occurring during the polymerization step is not completely understood, it is our belief that two distinct types of products, namely solid and liquid polymers, are formed as the result of two separate, but simultaneous or competitive reactions. In view of this, it was totally unexpected that two distinct products are obtained with practically no intermediate products, that is, the polymers are not merely a continuous spectrum of molecular weights. For example, the molecular weight of the liquid olefinic polymer is up to about 250, while the molecular weight of the solid will range from 1,000 up to 100,000 or more.

As hereinbefore set forth, the polymerization of ethylene to obtain two distinct products, one a solid polymer of high molecular weight, the other a liquid olefinic polymer having a relatively low molecular weight up to about 250, is effected in the presence of a novel catalyst comprising an alkali metal disposed on a promoted solid support. The term "promoted" as used in the specification and in the appended claims will refer to a pretreatment of the solid support with a compound selected from the group consisting of the salts and hydroxides of the alkali metals and alkaline earth metals. Examples of salts and hydroxides which may be used include lithium hydroxide, sodium hydroxide, potassium hydroxide, rubidium hydroxide, cesium hydroxide, magnesium hydroxide, calcium hydroxide, strontium hydroxide, barium hydroxide, lithium nitrate, sodium nitrate, potassium nitrate, calcium carbonate, magnesium carbonate, sodium carbonate, lithium carbonate, etc.; decomposable organic salts of the alkali metals and alkaline earth metals such as lithium acetate, sodium oxalate, etc., said hydroxides or salts completely neutralizing the acidity of the solid support.

The preferred supports which are neutralized in the process of this invention are those which are relatively or substantially free from water. In most cases, this freedom from water of the support is achieved by a precalcination treatment of said support. This precalcination treatment is carried out at a relatively high temperature in the range of from about 400° to about 700° C. and for a time sufficient to effect substantial removal of adsorbed or combined water from the support. The time required will vary depending upon the support, and in addition depending upon whether the water is in a combined or in merely a physically adsorbed form. In addition to the necessity for freedom from water, the support is characterized by the necessity for having a high surface area. By the term high surface area is meant a surface area measured by surface adsorption techniques within the range of from about 25 to about 500 or more square meters per gram and preferably a support having a surface area of approximately 100 to 300 square meters per gram. For example, it has been found that certain low surface area supports such as alpha-alumina which is obviously free from combined water and which has been freed from adsorbed water is not a satisfactory support for the alkali metals in the preparation of catalysts for use in the process of this invention. Alpha-alumina is usually characterized by a surface area ranging from about 10 to about 25 square meters per gram. In contrast gamma-alumina, which has a surface area ranging from about 100 to about 300 square meters per gram and which has been freed from adsorbed water and which contains little combined water, is a satisfactory support. Celite, a naturally occurring mineral, after precalcination, is not a satisfactory support. Celite has a surface area of from about 2 to about 10 square meters per gram. Likewise alkali metal dispersions on sand or on other low surface area silica are not satisfactory catalysts in this process. In addition, aluminas which contain combined water but which have relatively high surface areas are also not satisfactory supports. Such aluminas include dried alumina mono-hydrates which have not been sufficiently calcined to remove combined water and to form gamma-alumina. These alumina hydrates may have surface areas ranging from about 50 to about 200 square meters per gram but because they contain combined water are not satisfactory supports. Particularly preferred supports for the preparation of catalysts for use in the process of this invention include high surface area crystalline alumina modifications such as gamma-, eta- and theta-alumina, although these are not necessarily of equivalent suitability. However, as is obvious from the above discussion, the limitation on the use of any particular support is one of freedom from combined or adsorbed water in combination with the surface area of the support selected. In addition to the aforementioned type of support, another type is that which is prepared from an alkali aluminate such as sodium aluminate, potassium aluminate, etc., from which a substantial majority of the alkali metal has been removed leaving only the alumina with a relatively minor amount of the alkali metal present. In addition to the aforementioned aluminas, it is also contemplated that other refractory oxide supports including silica gel, silica-alumina composite, silica-zirconia, silica-magnesia, etc., which possess a surface area in the range of from about 25 to about 500 square meters per gram, and have been pretreated with a compound of the type hereinbefore set forth to completely neutralize the acidity of the support, may also be utilized in the process of the present invention.

The desired support which possesses the necessary high surface area, preferably, although not necessarily, gamma-, eta- or theta-alumina, is pretreated with a promoter in any manner. One method of impregnating the solid support is to treat said support with a solution of an alkali metal salt or hydroxide or an alkaline earth metal salt or hydroxide of the type hereinbefore set forth, dry the resultant composite and thereafter calcine said composite at a temperature usually in the range of from about 500° to about 700° C. for a period of from about 1 to about 4 hours in the presence of air before adding the alkali metal thereto.

The alkali metal selected from the group consisting of lithium, sodium, potassium, rubidium and cesium, and preferably sodium or potassium due to the relatively large amount of these metals available and the correspondingly lower cost of the same, is disposed on the non-acidic high surface area support in any conventional manner. For example, the promoted solid support and the predetermined amount of the alkali metal may be placed in appropriate apparatus which is thereafter heated to a temperature exceeding the melting point of the metal. The metal in a molten state will then be disposed on the surface of the solid support, preferably a metal oxide of the type hereinbefore set forth in greater detail, in such a manner as to impart certain catalytic characteristics to the finished composite. It is contemplated within the scope of this invention that the alkali metal will be present on the promoted support in an amount within the range of from about 5% to about 25% by weight of the support.

The polymerization process of the present invention utilizing a novel catalytic composition of matter of the type prepared according to the process hereinbefore set forth in which ethylene is polymerized to form desired polymers thereof, namely, a liquid olefinic polymer containing from about 8 to about 18 carbon atoms and having a molecular weight of up to about 250 and a solid polymer having a molecular weight of from about 1,000 up to about 100,000 or more, may be effected in any suitable manner and may comprise either a batch or continuous type operation. Due to the particular novel catalytic compositions of matter which are utilized in the process of this invention, namely, an alkali metal disposed on a non-acidic high surface area solid support, the polymers which result from this process will comprise both high molecular weight solids and straight chain or slightly branched liquid olefins. An example of a batch type operation in which ethylene is polymerized to form resultant polymers comprises a process in which a quantity of ethylene is charged to an appropriate apparatus such as a rotating autoclave containing the alkali metal disposed on a non-acidic or promoted high surface area solid support. Preferably, a paraffinic hydrocarbon which is straight chain in configuration such as n-hexane, n-heptane, n-octane, etc., may also be present in the reaction vessel. The vessel is then heated to a temperature within the range of from about 100° to about 200° C. It is contemplated within the scope of this invention that elevated pressures may be used, said pressures being in the range of from about 500 to about 2500 p.s.i.g., the amount of pressure utilized being sufficient to maintain a substantial portion of the reaction mixture in liquid phase. At the end of the predetermined residence time the apparatus such as a rotating autoclave is allowed to cool to room temperature. The excess pressure is vented and the resultant polymers comprising, as hereinbefore set forth, a mixture of a high molecular weight solid polymer and a slightly branched liquid olefin of from about 8 to about 18 carbon atoms in length are recovered.

The polymerization process of the present invention may also be effected in a continuous type operation, a particularly suitable type of operation utilizing the novel catalytic composition of matter comprising a fixed bed method. In this method the catalyst is disposed on a fixed bed in a reaction zone which is maintained at the proper operating conditions of temperature and pressure. The ethylene feed stock is continuously charged to the reaction zone and maintained in said zone for a predetermined residence time. In addition, the inert solvent comprising the paraffinic hydrocarbon is also continuously charged to the reaction zone. Alternatively the olefinic hydrocarbon comprising ethylene and the organic solvent may be admixed prior to entry into said reactor and charged thereto in a single stream. Upon completion of the desired residence time, the polymers are continuously discharged and recovered and separated by conventional means, as by centrifuging or filtration, into the high molecular weight solid and the liquid olefin. It is also contemplated within the scope of this invention that a moving bed type of operation may be used in which the catalytic composite bed and the ethylene pass either concurrently or countercurrently to each other in the reaction zone. In carrying out the process of this invention in a continuous manner, liquid hourly space velocities may be varied within a relatively wide range of from about 0.1 to about 20 or more, the preferred range being from about 0.1 to about 10.

The following examples are given to illustrate the process of the present invention which, however, are not intended to limit the generally broad scope of the present invention in strict accordance therewith.

EXAMPLE I

A catalyst for the polymerization of ethylene was prepared by adding 21 g. of lithium nitrate to 413 g. of gamma-alumina which had been previously calcined. The excess water was removed in a rotary steam dryer and the resulting composite thereafter calcined at a temperature of 200° C. for a period of 2 hours and at a temperature of 550° C. for a period of 6 hours.

To 400 cc. (235.3 g.) of lithiated alumina which contained 0.5% of lithium there was added 47 g. of metallic sodium. The lithiated alumina was placed in a three-necked flask, the sodium was added and the flask was heated to a temperature of about 125° C. The admixture was thoroughly admixed during the heating period and nitrogen gas was passed through the system. The sodium which possesses a melting point of 97.5° C. melted and was absorbed on the alumina which had been promoted by the addition of the lithium nitrate and subsequent calcination. The resulting catalyst which was a novel composition of matter comprised sodium composited on a promoted gamma-alumina support, said support, as hereinbefore set forth, having been promoted with lithium nitrate and calcination.

EXAMPLE II

Another catalyst which is used for the polymerization of ethylene is prepared by treating gamma-alumina with sodium hydroxide, and thereafter removing excess water by calcination at a temperature of about 200° C. for a period of 2 hours followed by calcination at 550° C. for a period of 6 hours, said calcination being done in the presence of air. The gamma-alumina which has been promoted with sodium was then placed in a flask similar to that set forth in Example I above and metallic sodium added thereto. The flask was heated to a temperature of about 130° C. with constant agitation under a blanket of nitrogen gas, the metallic sodium melting at a temperature of about 98° C. and flowing over the surface of the promoted alumina in such a manner as to be absorbed thereon. The finished catalyst contained 18% sodium composited on the promoted gamma-alumina.

EXAMPLE III

Another ethylene polymerization catalyst was prepared by treating gamma-alumina with potassium hydroxide in a manner similar to that hereinbefore set forth. After calcination the promoted alumina is placed in a three-necked flask to which is added metallic potassium. The flask is heated to a temperature of about 90° C. accompanied by constant agitation while blanketing the mixture with nitrogen gas. The metallic potassium which melts at 63.4° C. is composited on the promoted alumina in such a manner as to be absorbed by said promoted alumina. The finished catalyst will contain 20% potassium composited on a promoted gamma-alumina.

EXAMPLE IV

A catalyst prepared according to Example II above was utilized to polymerize ethylene. In this example the catalyst was placed in a reactor comprising a stainless steel tube, approximately 50 cc. of the catalyst being utilized in this reaction. The tube was filled with catalyst under a nitrogen flow and sealed. The system was then pressured with dry nitrogen following which the charge stock comprising ethylene in a heptane solvent was pumped through the reactor at a liquid hourly space velocity of about 1.5. The polymerization of the ethylene was effected at a temperature ranging from about 133°–136° C. and at a pressure of about 1200 p.s.i.g. The product was collected and subjected to fractional distillation. The cut boiling at 105° to 150° C. contained 98% olefins of which 83% comprised $C_8$ polymers. Another cut boiling in the range of from 150° C. to 200° C. contained 96% olefins of which 52% comprised $C_{10}$ and 35% comprised $C_{12}$ olefins. Another cut boiling in the range of from 200° to 250° C. contained 91% olefins of which 13% where $C_{12}$, 46% were $C_{14}$ and 21% were $C_{16}$ in length. The bottoms which boiled at a temperature greater than 250° C. contained a waxy solid.

The product from another period of the polymerization reaction which was effected at the same temperature and pressure but at a combined liquid hourly space velocity of only 0.9 was separated and recovered. The cut boiling at 99° to 150° C. contained 96% olefins of which 85% comprised $C_8$ polymers. Another cut boiling at from 150° to 180° C. contained 91% olefins of which 53% were $C_{10}$ polymers and 20% were $C_{12}$ polymers. The solids recovered from this product were analyzed and found to contain 14.53% hydrogen and 84.57% carbon, corresponding to the empirical formula $C_nH_{2.04n}$, or very closely to $(C_2H_4)_x$.

EXAMPLE V

In this example a catalyst prepared according to Example III was utilized to polymerize ethylene. The catalyst was placed in a reactor similar to that described in Example IV above and after a similar treatment a feed stock comprising ethylene in an n-heptane diluent was charged thereto. A polymerization was effected at a temperature in the range of from about 107° to about 116° C. and at a pressure of 1200 pounds per square inch, the combined hourly space velocity being 1.6. The products at the end of 58 hours were analyzed. The cut boiling at from 105°–175° C. comprising 41.4 g. contained 99.5% olefins. The cut boiling at 175°–225° C. comprising 12.9 g. contained 94.6% olefins. The solids comprising 98 g. contained 14.47% hydrogen and 84.84% carbon, corresponding to the empirical formula $C_nH_{2.03n}$, or very closely to $(C_2H_4)_x$.

The polymerization was continued at a temperature of about 110°–118° C. and at a pressure of 600 pounds per square inch. At the end of 230 hours the products were subjected to fractional distillation. The cut boiling at 105°–175° C. comprising 144 g. was 100% olefinic in nature. The cut boiling at 175°–225° C. comprising 47 g. was also 100% olefinic in nature. The solids comprising 317 g. analyzed at 14.47% hydrogen and 85.30% carbon, or $C_nH_{2.02n}$.

The cut which boiled at 105°–175° C., which is labeled A, contained 66% $C_8$ olefins and 26% $C_{10}$ olefins, the remainder being diolefins or cyclic olefins. The cut boiling at 175°–225° C., labeled B, contained 5% $C_{10}$ olefins, 67% $C_{12}$ olefins and 9% $C_{14}$ olefins, the remainder being diolefins or cyclo olefins. The type of olefins which were present in cuts A and B is illustrated in Table I below.

Olefin type, percent

| | $\begin{array}{c}R\\|\\C=CH_2\\|\\H\end{array}$ | $\begin{array}{c}R\phantom{X}R\\|\phantom{X}|\\C=C\\|\phantom{X}|\\H\phantom{X}H\end{array}$ | $\begin{array}{c}R\\|\\C=CH_2\\|\\R\end{array}$ | $\begin{array}{c}R\phantom{X}R\\|\phantom{X}|\\C=C\\|\phantom{X}|\\R\phantom{X}H\end{array}$ | $\begin{array}{c}R\phantom{X}R\\|\phantom{X}|\\C=C\\|\phantom{X}|\\R\phantom{X}R\end{array}$ |
|---|---|---|---|---|---|
| Cut A | 5 | 58 | 3 | 11 | 23 |
| Cut B | 2 | 53 | 5 | 12 | 28 |

It is therefore apparent from the above table that a major portion of the olefins containing from 8 to about 14 carbon atoms comprise either straight-chain or slightly branched hydrocarbons, this particular type of configuration being especially useful in preparing biodegradable detergents.

We claim as our invention:

1. A process for the homopolymerization of ethylene for the production of a solid polymer of a molecular weight in excess of about 1,000 and a liquid polymer of from about 8 to about 18 carbon atoms and having a molecular weight of up to about 250, which comprises treating ethylene at a temperature within the range of from about 100° to about 200° C. and at a pressure within the range of from about 500 to about 2500 p.s.i.g. in the presence of a polymerization catalyst consisting essentially of an alkali metal disposed on a substantially anhydrous refractory inorganic oxide support having a surface area of from about 25 to about 500 square meters per gram which has been promoted with a compound selected from the group consisting of the salts and hydroxides of the alkali metals and alkaline earth metals and thereafter calcined, said compound being in sufficient amount to completely neutralize the acidity of said support, and recovering the resultant polymers.

2. A process for the homopolymerization of ethylene for the production of a solid polymer of a molecular weight in excess of about 1,000 and a liquid polymer of from about 8 to about 18 carbon atoms and having a molecular weight of up to about 250, which comprises treating ethylene at a temperature within the range of from about 100° to about 200° C. and at a pressure within the range of from about 500 to about 2500 p.s.i.g. in the presence of a polymerization catalyst consisting essentially of an alkali metal disposed on a substantially anhydrous alumina support having a surface area of from about 25 to about 500 square meters per gram which has been promoted with a compound selected from the group consisting of the salts and hydroxides of the alkali metals and alkaline earth metals and thereafter calcined, said compound being in sufficient amount to completely neutralize the acidity of said support, and recovering the resultant polymers.

3. A process for the homopolymerization of ethylene for the production of a solid polymer of a molecular weight in excess of about 1,000 and a liquid polymer of from about 8 to about 18 carbon atoms and having a molecular weight of up to about 250, which comprises treating ethylene at a temperature within the range of from about 100° to about 200° C. and at a pressure within the range of from about 500 to about 2500 p.s.i.g. in the presence of a polymerization catalyst consisting essentially of an alkali metal disposed on a substantially anhydrous gamma-alumina support which has been promoted with a compound selected from the group consisting of the salts and hydroxides of the alkali metals and alkaline earth metals and thereafter calcined, said compound being in sufficient amount to completely neutralize the acidity of said support, and recovering the resultant polymers.

4. A process for the homopolymerization of ethylene for the production of a solid polymer of a molecular weight in excess of about 1,000 and a liquid polymer of from about 8 to about 18 carbon atoms and having a molecular weight of up to about 250, which comprises treating ethylene at a temperature within the range of from about 100° to about 200° C. and at a pressure within the range of from about 500 to about 2500 p.s.i.g. in the presence of a polymerization catalyst consisting essentially of an alkali metal disposed on a substantially anhydrous alumina support having a surface area of from about 25 to about 500 square meters per gram which has been promoted with an alkali metal salt and thereafter calcined, said metal salt being in sufficient amount to completely neutralize the acidity of said support, and recovering the resultant polymers.

5. A process for the homopolymerization of ethylene for the production of a solid polymer of a molecular weight in excess of about 1,000 and a liquid polymer of from about 8 to about 18 carbon atoms and having a molecular weight of up to about 250, which comprises treating ethylene at a temperature within the range of from about 100° to about 200° C. and at a pressure within the range of from about 500 to about 2500 p.s.i.g. in the presence of a polymerization catalyst consisting essentially of an alkali metal disposed on a substantially anhydrous alumina support having a surface area of from about 25 to about 500 square meters per gram which has been promoted with an alkali metal hydroxide and thereafter calcined, said hydroxide being in sufficient amount to completely neutralize the acidity of said support, and recovering the resultant polymers.

6. A process for the homopolymerization of ethylene for the production of a solid polymer of a molecular weight in excess of about 1,000 and a liquid polymer of from about 8 to about 18 carbon atoms and having a molecular weight of up to about 250, which comprises treating ethylene at a temperature within the range of from about 100° to about 200° C. and at a pressure within the range of from about 500 to about 2500 p.s.i.g. in the presence of a polymerization catalyst consisting essentially of an alkali metal disposed on a substantially anhydrous alumina support having a surface area of from about 25 to about 500 square meters per gram which has been promoted with lithium nitrate and thereafter calcined, said nitrate being in sufficient amount to completely neutralize the acidity of said support, and recovering the resultant polymers.

7. A process for the homopolymerization of ethylene for the production of a solid polymer of a molecular weight in excess of about 1,000 and a liquid polymer of from about 8 to about 18 carbon atoms and having a molecular weight of up to about 250, which comprises treating ethylene at a temperature within the range of from about 100° to about 200° C. and at a pressure within the range of from about 500 to about 2500 p.s.i.g. in the presence of a polymerization catalyst consisting essentially of an alkali metal disposed on a substantially anhydrous alumina support having a surface area of from about 25 to about 500 square meters per gram which has been promoted with lithium hydroxide and thereafter calcined, said hydroxide being in sufficient amount to completely neutralize the acidity of said support, and recovering the resultant polymers.

8. A process for the homopolymerization of ethylene for the production of a solid polymer of a molecular weight in excess of about 1,000 and a liquid polymer of from about 8 to about 18 carbon atoms and having a molecular weight of up to about 250, which comprises treating ethylene at a temperature within the range of from about 100° to about 200° C. and at a pressure within the range of from about 500 to about 2500 p.s.i.g. in the presence of a polymerization catalyst consisting essentially of sodium disposed on a substantially anhydrous gamma-alumina support which has been promoted with a compound selected from the group consisting of the salts and hydroxides of the alkali metals and alkaline earth metals and thereafter calcined, said compound being in sufficient amount to completely neutralize the acidity of said support, and recovering the resultant polymers.

9. A process for the homopolymerization of ethylene for the production of a solid polymer of a molecular weight in excess of about 1,000 and a liquid polymer of from about 8 to about 18 carbon atoms and having a molecular weight of up to about 250, which comprises treating ethylene at a temperature within the range of from about 100° to about 200° C. and at a pressure within the range of from about 500 to about 2500 p.s.i.g. in the presence of a polymerization catalyst consisting essentially of potassium disposed on a substantially anhydrous gamma-alumina support which has been promoted with a compound selected from the group consisting of the salts and hydroxides of the alkali metals and alkaline earth metals and thereafter calcined, said compound being in sufficient amount to completely neutralize the acidity of said support, and recovering the resultant polymers.

10. An ethylene homopolymerization process for the preparation of a solid polymer of a molecular weight in excess of about 1000 and a liquid olefinic polymer of from about 8 to about 18 carbon atoms and having a molecular weight of up to about 250, which comprises treating ethylene at a temperature within the range of from about 100° to about 200° C. and at a pressure within the range of from about 500 to about 2500 p.s.i.g. in the presence of a polymerization catalyst consisting essentially of sodium disposed on a substantially anhydrous gamma-alumina support which has been promoted with lithium nitrate and thereafter calcined, said nitrate being in sufficient amount to completely neutralize the acidity of said support, and recovering the resultant polymers.

11. An ethylene homopolymerization process for the preparation of a solid polymer of a molecular weight in excess of about 1000 and a liquid olefinic polymer of from about 8 to about 18 carbon atoms and having a molecular weight of up to about 250, which comprises treating ethylene at a temperature within the range of from about 100° to about 200° C. and at a pressure within the range of from about 500 to about 2500 p.s.i.g. in the presence of a polymerization catalyst consisting essentially of potassium disposed on a substantially anhydrous gamma-alumina support which has been promoted with lithium nitrate and thereafter calcined, said nitrate being in sufficient amount to completely neutralize the acidity of said support, and recovering the resultant polymers.

12. An ethylene homopolymerization process for the preparation of a solid polymer of a molecular weight in excess of about 1000 and a liquid olefinic polymer of from about 8 to about 18 carbon atoms and having a molecular weight of up to about 250, which comprises treating ethylene at a temperature within the range of from about 100° to about 200° C. and at a pressure within the range of from about 500 to about 2500 p.s.i.g. in the presence of a polymerization catalyst consisting essentially of sodium disposed on a substantially anhydrous gamma-alumina support which has been promoted with lithium hydroxide and thereafter calcined, said hydroxide being in sufficient amount to completely neutralize the acidity of said support, and recovering the resultant polymers.

13. An ethylene homopolymerization process for the preparation of a solid polymer of a molecular weight in excess of about 1000 and a liquid olefinic polymer of from about 8 to about 18 carbon atoms and having a molecular weight of up to about 250, which comprises treating ethylene at a temperature within the range of from about 100° to about 200° C. and at a pressure within the range of from about 500 to about 2500 p.s.i.g. in the presence of a polymerization catalyst consisting essentially of potassium disposed on a substantially anhydrous gamma-alumina support which has been promoted with lithium hydroxide and thereafter calcined, said hydroxide being in sufficient amount to completely neutralize the acidity of said support, and recovering the resultant polymers.

References Cited

UNITED STATES PATENTS

| | | | |
|---|---|---|---|
| 2,861,983 | 11/1958 | Fotis | 260—94.9 |
| 2,887,472 | 5/1959 | Fotis | 260—94.9 |
| 3,352,795 | 11/1967 | Shepard et al. | 260—94.9 |
| 3,326,871 | 6/1967 | Shepard et al. | 260—94.9 |

FOREIGN PATENTS 917,358   2/1963   Great Britain.

JOSEPH L. SCHOFER, *Primary Examiner.*

M. B. KURTZMAN, *Assistant Examiner.*